INVENTOR:
JOHN A. WINTROATH,
BY
ATTORNEY.

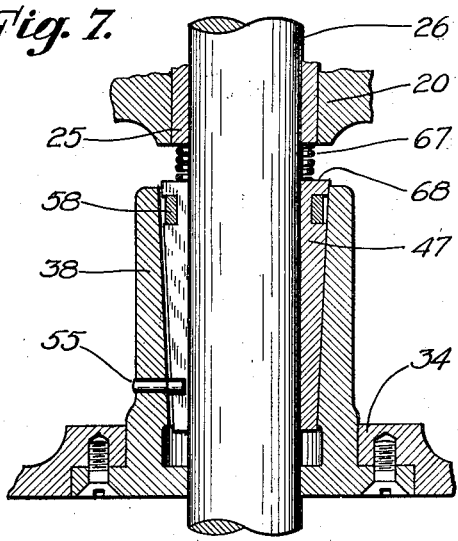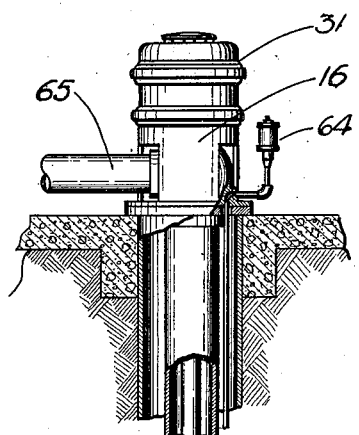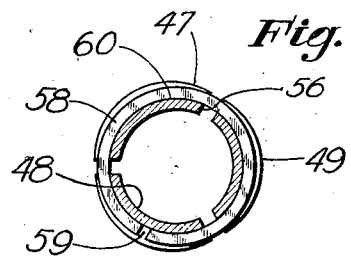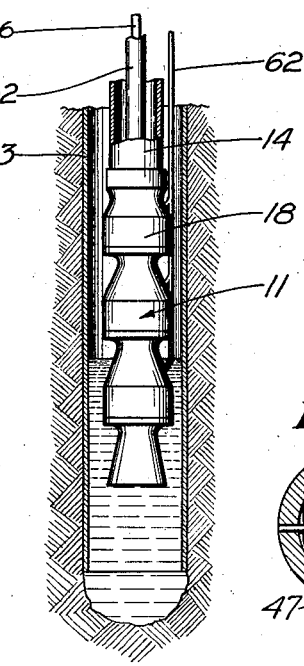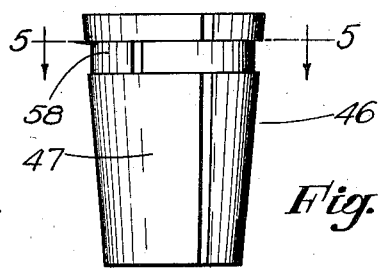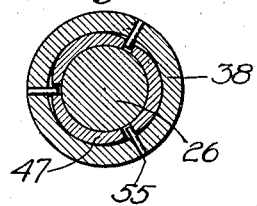

Patented Apr. 29, 1930

1,756,326

UNITED STATES PATENT OFFICE

JOHN A. WINTROATH, OF LOS ANGELES, CALIFORNIA, ASSIGNOR TO PEERLESS PUMP COMPANY, OF LOS ANGELES, CALIFORNIA, A CORPORATION OF CALIFORNIA

SELF-ADJUSTING INTERMEDIATE BUSHING

Application filed July 30, 1925. Serial No. 46,978.

My invention relates particularly to self-adjusting bearings. It is especially useful in vertical turbine irrigation pumps and I shall therefore describe it in this use in the following description.

A vertical turbine irrigation pump has a pump section which is installed near the bottom of a well at the lower end of a column pipe. The column pipe is attached to a pump head at the surface of the ground. Impellers of the pump section are rotated by a shaft on which they are attached, which shaft extends through the column pipe to the pump head. When bearings of the pump section supporting the shaft wear, particles of abrasive material carried in the water being pumped enter between the bearings and the shaft. These abrasive particles rapidly wear and cut away both the shaft and the bearings. As a result, there is leakage around the shaft through the bearings and also a whipping of the shaft. When the shaft whips, the impellers engage walls of the impeller sections of the pump, causing wear thereon and on the impellers. Large spaces are thereby formed between the impellers and the impeller sections through which considerable water may leak. The efficiency of the pump is noticeably reduced and the impellers and impeller sections are sometimes damaged beyond useableness.

It is an object of this invention to provide a mechanical self-adjusting wear compensating bearing which at all times is in journalling relationship with the shaft.

It is also an object of my invention to provide a bearing of this character having a segmental bearing member which is self-centralizing.

It is another object of my invention to provide a bearing of the character mentioned in which the segments are novelly held in proper relationship.

Other objects and advantages of this invention will be made evident hereinafter.

Referring to the two sheets of drawings in which I illustrate my invention,

Fig. 1 is a diagrammatic view showing a vertical turbine pump on which my invention is used.

Fig. 4 is an elevational view of a segmental bearing member of my invention.

Fig. 5 is a section taken on the line 5—5 of Fig. 4.

Fig. 6 is a section taken on the line 6—6 of Fig. 2.

Fig. 7 is a fragmentary sectional view of an alternative form of my invention.

Figure 2:
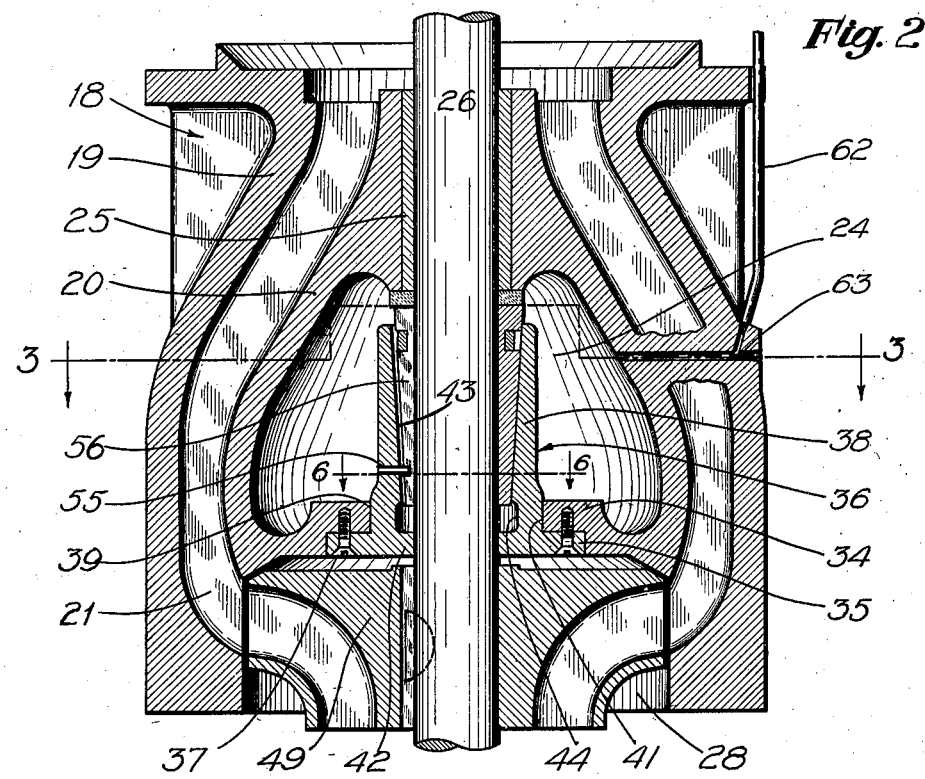
Fig. 2 is an enlarged sectional view taken through an impeller section of the pump shown in Fig. 1, showing in detail my invention.

With reference to Fig. 1, 11 represents a pump section which is installed near the bottom of a well 13 and which is attached to the lower end of a column pipe 14. The column pipe 14 extends up through the well 13 and attaches to a pump head 16. The pump section 11 is composed of a plurality of impeller sections 18, each of which is constructed as shown clearly in Figs. 2 and 3.

With reference to these figures, each impeller section 18 has an outer shell 19 and an inner shell 20 between which shells there is formed a water passage 21. The shells 19 and 20 are secured together by a plurality of diffusion vanes 23. The inner shell 20 provides a bearing chamber 24. Positioned in a bore of the upper part of the inner shell 20 is a bearing bushing member 25, through which a shaft 26 extends, this shaft 26 extending entirely through the impeller section 18. This member 25 acts both to journal the shaft and to prevent a flow of fluid to or from the bearing chamber. An impeller chamber 28 is formed inside the outer shell 19 below the inner shell 20, in which an impeller 49 secured to the shaft 26 is placed. The shaft 26 extends to a motor 31 of the head 16 through an oil tube 32, as shown in Fig. 1.

The bearing chamber 24 has a lower annular ledge 34 to which a flange 35 of a bearing container 36 is secured by means of screws 37, the ledge 34 and flange 35 cooperating to form a radial wall above the impeller chamber 28. A cup 38 of the bearing container 36 has a cylindrical wall 39 which engages a cylindrical wall 41 provided by the annular ledge 34. An inner annular lip 42 of the bearing container surrounds the shaft 26. The cup 38 has an inner conical face 43 which is smaller in diameter at the lower end thereof and which concentrically surrounds the shaft 26. The conical face 43 is relieved at the lower end thereof, as indicated at 44. Resting in the cup 38 of the bearing container 36 is a segmental bearing 46 which is composed of segments 47, the cup 38 acting as a positioning means for these segments. As clearly shown in Figs. 4 and 5, the segments 47 have semi-cylindrical inner faces 48 which are of the same radius as the shaft 26. The segments 47 have outer conical faces 49 which are smaller at the lower ends thereof. These conical faces 49 are of a smaller radius than the conical face 43 of the bearing container 36, this being clearly shown in Fig. 3 and in Fig. 5. Therefore, as evident in Fig. 3 the segments 47 engage the conical face 43 of the bearing retainer 36 only centrally and along an axial line.

Figure 3:
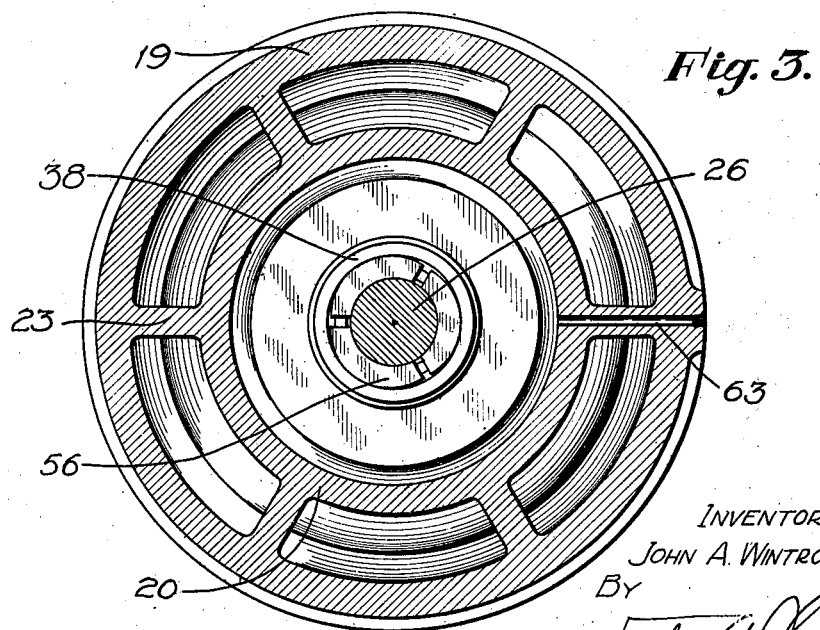
Fig. 3 is a section taken on the line 3—3 of Fig. 2.

The bearing member 46 is placed in the cup 38 as shown in Figs. 2, 3 and 6. The segments 47 are retained in proper circular arrangement by pins 55 which extend from the cup 38 between end faces 56 of the segments 47. The pins 55 hold them in proper position and prevent them from rotating but permit axial movement. A holding ring 58 which is split at 59 is placed in arcuated channels 60 formed near the upper ends of the segments 47. The ring 58 prevents relative axial movement between the segments 47 and thus retains them in proper relationship. The segments 47 are wedge shaped and tend to move downward in the cup 38. The co-engagement of the conical face 43 and the conical faces 49 will move the segments 47 inward when they move down. By this arrangement the bearing segments 47 are maintained in the journalling engagement with the shaft 26.

Lubricating oil is supplied to the bearing chamber 24 by an oil pipe 62 which connects with a passage 63 formed in the impeller section 19. The upper end of the oil pipe 62 has a sight feed drip oil cup 64 which supplies oil to the bearing chamber 24 through the pipe 62 and the passage 63.

The operation of the pump shown in Fig. 1 is substantially as follows. When the motor 31 is energized the impellers 29 of the pump section 18 are rotated thereby by means of the shaft 26. When the impellers rotate, water is forced through the column pipe 14 to the pump head 16, from which it is conducted by a discharge pipe 65. When the shaft 26 and the inner faces 48 of the segments 47 wear, the latter tend to move downward by gravity in the cup 38. They are also moved inward by the cooperation of the faces 43 and 49 and are thus maintained in a proper journalling relationship with the shaft 26. As the segments of the shaft wear, the segments by virtue of their arrangement and construction remain at all times in a certain relationship with the shaft and engage it with a proper force. All of the segments 47 move at the same time because of the holding ring 58 which prevents relative axial movement between the segments 47. No rotation in the segments 47 is present due to the fact that they are engaged by the pins 55. The semi-cylindrical faces 48 of the segments 47 adjust themselves to proper position around the shaft 26. The outer faces 49 of the segments 47 engage the conical face 43 of the cup 38 only on the central axial line 53 and no interference to an adjusting of the segments is present.

With my invention there will be no noticeable leakage around the shaft 26 and there will positively be no whipping of the shaft. My invention is a valuable asset to a turbine pump of this character or to any similar construction where proper journalling is absolutely necessary.

In Fig. 7 I show a form of my invention in which all of the parts are of the same construction as the form shown in Figs. 2 to 6 inclusive. In addition to these parts the alternative form of my invention employs a compression coil spring 67 which surrounds the shaft 26 and which engages the inner shell 20 and upper ends 68 of the segments 47. The spring 67 exerts a downward force on the segments 47 and mechanically and pressurably retains them in proper journalling relationship with the shaft 26.

In the first form of my invention the segments 47 are maintained in proper journalling relationship by gravity and may be varied by changing the degree of taper of the conical faces 43 and 49 or by changing the weight of the segments 47.

It should be understood that my invention may be used in other capacities than the one illustrated. Thus, I have found it advantageous to replace the conventional shaft bearings, spaced throughout the length of the shaft and held in the oil tube 32, with self-adjusting bearings. Due to the fact that ordinary bearings on such a line shaft are spaced a material distance apart, any wear on these bearings will cause a whipping of the shaft which in turn will cause additional wear, vibration, etc., this whipping action causing the impellers to move upward in their respective chambers. This upward movement displaces the impeller from its proper position and often causes a frictional engagement between the impeller and the walls of the impeller chamber, thus resulting in undue wear on the bowls and sometimes a failure of the shaft. If these conventional line shaft bearings are replaced by my improved type of self-adjusting and self-centralizing bearings, no whipping will take place, and the life of the pump will be materially lengthened.

I claim as my invention:

1. In a deep well turbine pump, the combination of: a pump head at the surface of the ground; a pump section suspended from said pump head and a substantial distance therebelow; an impeller in said pump section; a shaft operably connecting said impeller and a source of power adjacent said pump head; and a self-adjusting, self-centralizing bearing positioned below the surface of the ground and journalling said shaft to prevent said shaft from whipping when rotating.

2. In a deep well turbine pump, the combination of: a pump head at the surface of the ground; a pump section suspended from said pump head and a substantial distance therebelow; an impeller in said pump section; a shaft operably connecting said impeller and a source of power adjacent said pump head; and a plurality of self-adjusting, self-centralizing bearings spaced a distance from each other, said bearings journalling said shaft throughout its length to prevent whipping thereof when rotating at high speeds.

3. In a deep well turbine pump, the combination of: an impeller section positioned in a well and having an impeller chamber therein; a radial wall defining the upper end of said impeller chamber and the lower end of a bearing chamber; a shaft extending through an opening in said radial wall and through said chambers; a cup extending upward from said radial wall concentric with said shaft; and bearing segments disposed in said cup in journalling relation with said shaft.

4. A combination as defined in claim 3 in which said cup has a conical inner face diverging upward, and in which said bearing segments engage said face and said shaft in a manner to centralize said shaft.

5. In a deep well turbine pump, the combination of: an impeller section positioned in a well and having an impeller chamber and a bearing chamber therein; a wall separating said chambers; a shaft extending through an opening in said wall and through a bore of said impeller section; a segmental bearing supported by said wall in a manner to centralize said shaft; and a member in said bore of said impeller section, said member engaging the periphery of said shaft.

6. In a deep well turbine pump, the combination of: an impeller section positioned in a well and having a bearing chamber therein; a shaft extending through a pair of openings in said impeller section and through said bearing chamber; bearing segments held in centralizing relation with said shaft; and a member in one of said openings engaging the periphery of said shaft, said member impeding a flow of fluid to and from said bearing chamber.

7. A combination as defined in claim 6 in which said member comprises a bearing bushing for journalling said shaft.

8. In a deep well turbine pump, the combination of: a pump head at the surface of the ground; a pump section suspended from said pump head and a substantial distance therebelow; an impeller in said pump section; a shaft operably connecting said impeller and a source of power adjacent said pump head; and a self-adjusting bearing in said pump section and journalling said shaft.

In testimony whereof, I have hereunto set my hand at Los Angeles, California, this 24th day of July, 1925.

JOHN A. WINTROATH.